United States Patent [19]
Schiewe et al.

[11] Patent Number: 6,093,358
[45] Date of Patent: Jul. 25, 2000

[54] METHOD OF MAKING AN EXPANDABLE GAP FILLING PRODUCT

[75] Inventors: Julie A. Schiewe, Kansas City; Rick Raines, Lee's Summit, both of Mo.

[73] Assignee: Lear Corporation, Southfield, Mich.

[21] Appl. No.: 09/014,134

[22] Filed: Jan. 27, 1998

[51] Int. Cl.[7] .................................................. B29C 39/10
[52] U.S. Cl. ........................ 264/250; 264/45.4; 264/46.5; 264/259; 264/273
[58] Field of Search .................................. 264/273, 250, 264/46.5, 46.6, 259, 45.4

[56] References Cited

U.S. PATENT DOCUMENTS

| | | | |
|---|---|---|---|
| 3,930,771 | 1/1976 | Meyn | 264/273 |
| 4,006,210 | 2/1977 | Denton | 264/250 |
| 4,232,126 | 11/1980 | Marquisee | 521/65 |
| 4,286,001 | 8/1981 | Frau | 264/250 |
| 4,399,174 | 8/1983 | Tanaka et al. | 428/67 |
| 4,440,434 | 4/1984 | Celli | 296/185 |
| 4,559,688 | 12/1985 | Abu-Isa et al. | 29/157.3 |
| 4,584,344 | 4/1986 | Baer | 525/66 |
| 4,659,410 | 4/1987 | McDowell et al. | 156/277 |
| 4,707,513 | 11/1987 | Baer | 524/504 |
| 4,778,366 | 10/1988 | Weaver | 425/110 |
| 4,912,826 | 4/1990 | Dixon et al. | 29/281.1 |
| 4,973,102 | 11/1990 | Bien | 296/187 |
| 4,974,900 | 12/1990 | Destefani et al. | 296/187 |
| 4,989,913 | 2/1991 | Moore, III | 296/205 |
| 5,102,188 | 4/1992 | Yamane | 296/205 |
| 5,213,391 | 5/1993 | Takagi | 296/205 |
| 5,213,749 | 5/1993 | Huss et al. | 264/273 |
| 5,266,133 | 11/1993 | Hanley et al. | 156/71 |
| 5,290,079 | 3/1994 | Syamal | 293/120 |
| 5,324,470 | 6/1994 | Comert et al. | 264/255 |
| 5,344,208 | 9/1994 | Bien et al. | 296/187 |
| 5,373,027 | 12/1994 | Hanley et al. | 521/84.1 |
| 5,575,525 | 11/1996 | Walworth, Jr. et al. | 296/183 |
| 5,581,019 | 12/1996 | Minor et al. | 73/115 |
| 5,642,914 | 7/1997 | Takabatake | 296/187 |
| 5,866,052 | 2/1999 | Muramatsu | 264/46.4 |

*Primary Examiner*—Allan R. Kuhns
*Attorney, Agent, or Firm*—Wood, Herron & Evans, L.L.P.

[57] ABSTRACT

An expandable gap filling product, such as a gasket or baffle, including a plastic support structure formed with at least one aperture and an expandable material molded together with the plastic support structure such that a portion of the expandable material enters the aperture to assist in holding the expandable material to the plastic support structure. The expandable material may be a conventional expandable rubber product that expands under heat to fill a defined space, such as an automotive body interior space. Apertures in the support structure may have converging side walls to further assist in holding the expandable material in place. The support structure may be molded as a mesh material with a plurality of apertures. Methods of molding the expandable gap filling product include injection molding and overmolding or insertion molding methods.

10 Claims, 6 Drawing Sheets

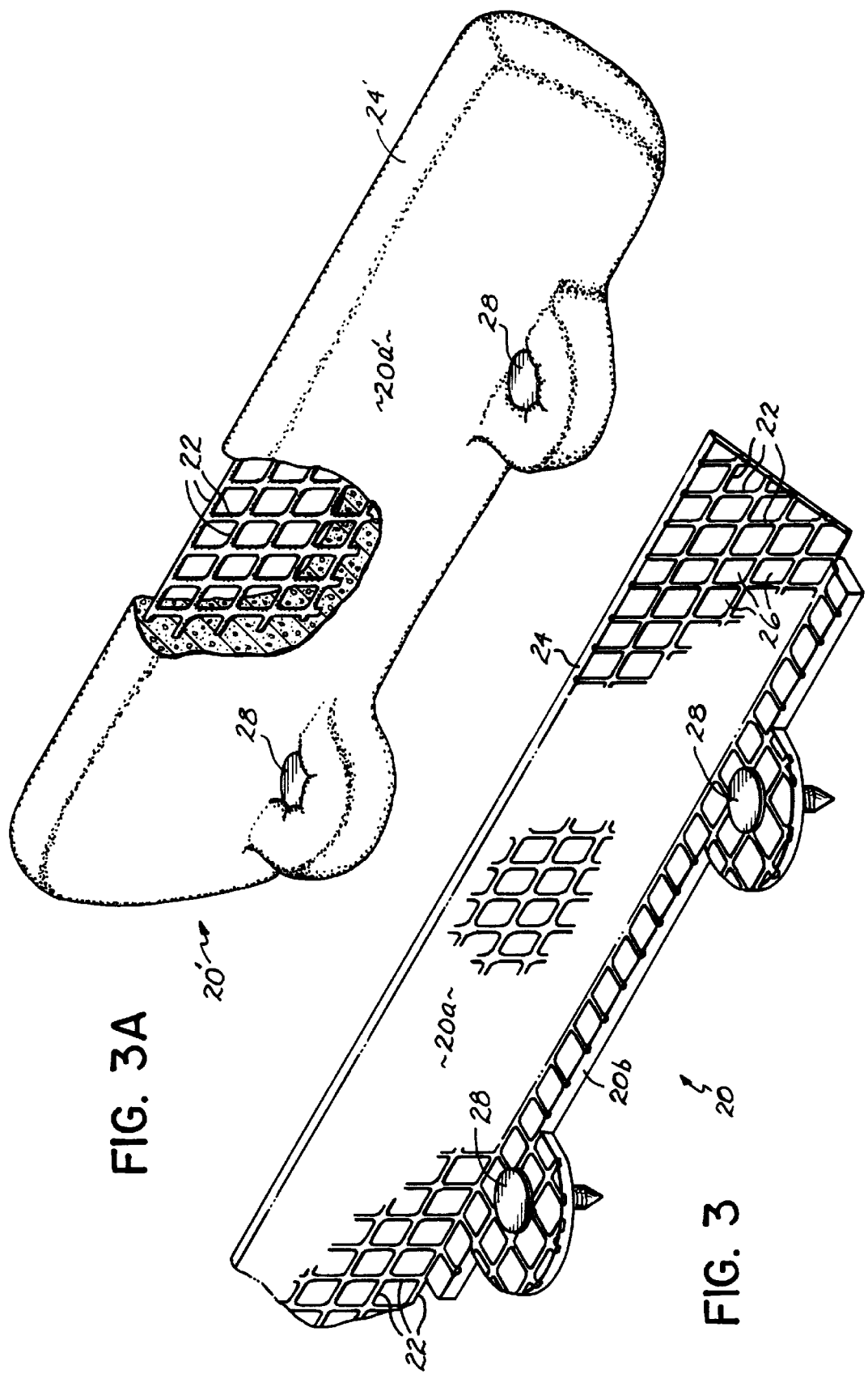

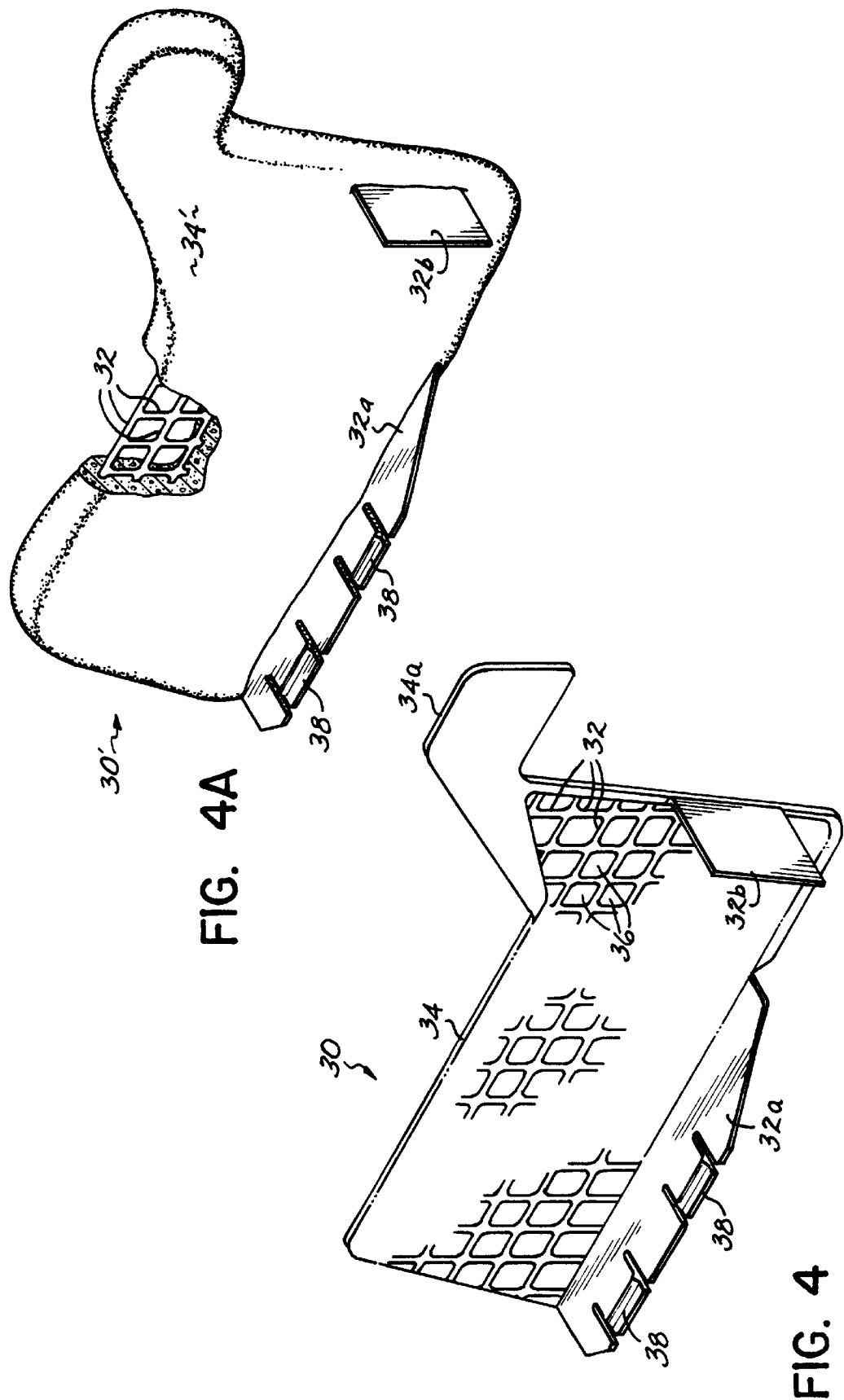

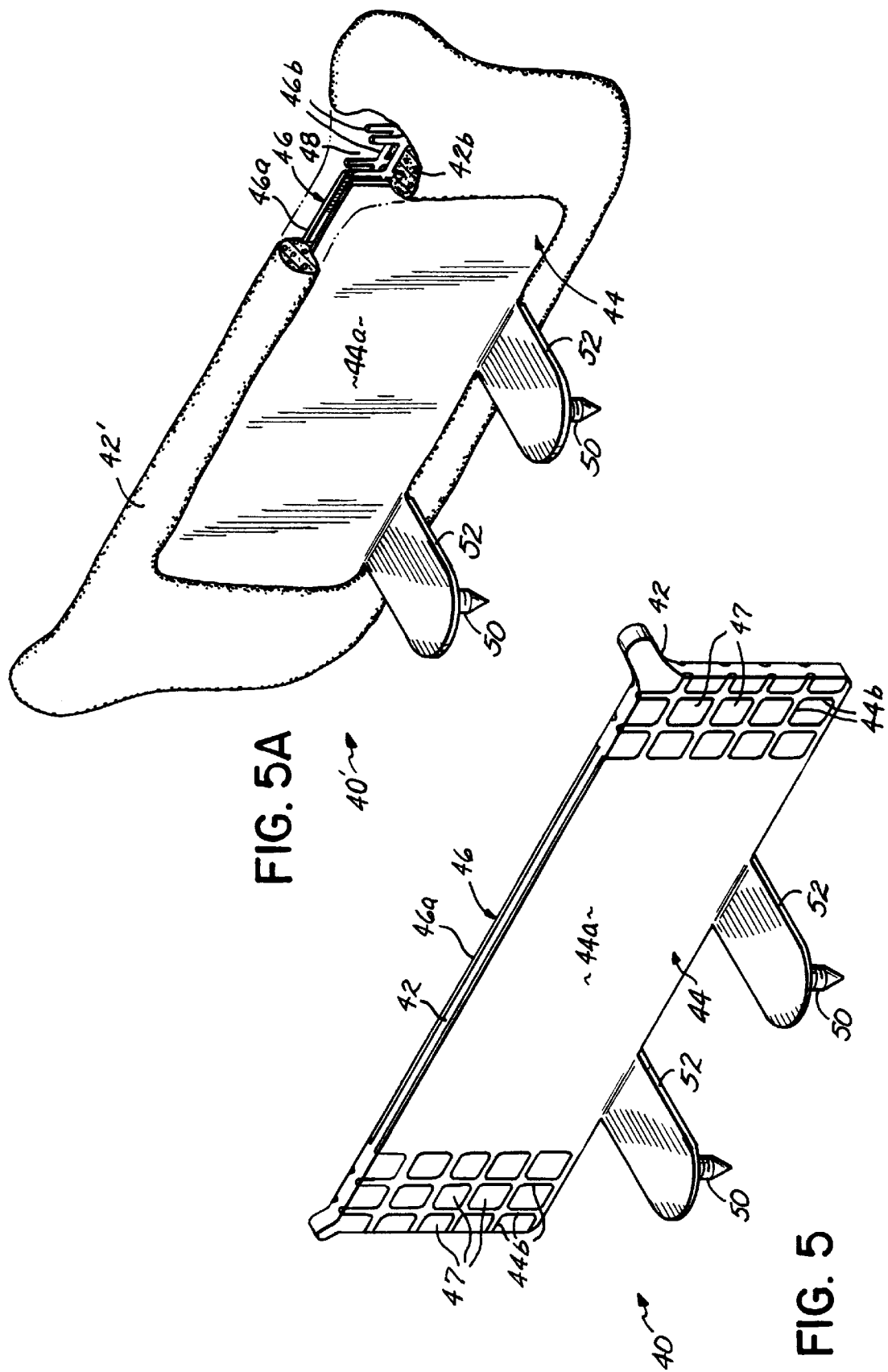

METHOD OF MAKING AN EXPANDABLE GAP FILLING PRODUCT

FIELD OF THE INVENTION

The present invention generally relates to formable gap filling products, such as seals, gaskets and baffles, and, more particularly, to such products that expand under heat to fill or block a defined space.

BACKGROUND OF THE INVENTION

In industries such as the automobile industry, it is often necessary to seal or block certain defined spaces, such as the within pillars or other structural support members of an automobile body. When such pillars or support members are hollow, for example, they may provide a pathway for air or liquid to travel through or into the automobile body. This is undesirable as such pathways or spaces increase the amount of noise within the automobile interior and provide areas for water from rain or car washes to collect. It has been a regular practice to attach expandable gaskets or baffles within these areas of the automobile body structure. Expandable gaskets or baffles have been formed of a rigid steel or plastic support structure connected to an expandable material, such as an expandable rubber compound. Many expandable rubber or polymer compounds exist that expand into a closed cell foam under applied heat, such as during the paint baking process of the automobile body. These materials are well known in the automobile industry and related industries. They are generally capable of being formed into various shapes by injection or extrusion molding techniques. The foam is often used to fill the defined space within the automobile frame thereby blocking a potential pathway for air or liquid.

Typical expandable gaskets or baffles have been constructed with either a plastic or metal plate structure mechanically fastened to the expandable material with clips or press fit pins extending from the support plate. For example, steel plates with a plurality of apertures have been used as gasket or baffle support structures. For a baffle, two steel plates may sandwich a flat piece of expandable material. For a gasket, the expandable rubber may be attached to one side of a support plate. In these typical examples, the attachment is made using metal or plastic clips. Apertures have been provided in steel plates to reduce the weight of the plate and to provide a limited pathway for the expandable rubber to foam through to the opposite side of the plate. The plate may further include fasteners for mounting the gasket or baffle to a desired portion of the automobile body structure. These fasteners have been separate fasteners or integral fasteners, such as bends in a steel plate formed as a clip. A major drawback to these products is the relatively high manufacturing and assembly costs due to the use of steel and the use of separately fastened parts.

One alternative method for making a gasket has been to extrude an expandable rubber sheet material and then calender or embed this material into a wire mesh, such as 21 gauge wire mesh material. The embedding process is performed by opposed rollers while the extruded, expandable rubber material is still soft from the extruded sheet production process. This produces a large roll of flat composite material which may then be die cut into gaskets or baffles. Due to the plastic deformability of the wire mesh material, these baffles may be bent for a particular application. Separate fastener elements are generally inserted through the formed gasket to allow it to be fastened to an automobile body. These wire mesh gaskets, however, have a tendency to remain flat due to the resilience of the rubber material. That is, the wire mesh may not be strong enough to retain certain bends in place, especially during shipping or storage. Also, as the product is a steel and rubber composite, the scrap produced during the die cutting process cannot be easily reclaimed or recycled since the expandable rubber material is not easily separated from the wire mesh and since the wire mesh will not melt back into the rubber material.

Another sealing product currently used in the automotive industry comprises a solid plastic plate overmolded with an expandable material. One disadvantage of this product is that the solid plates increase the weight of the product. Also, adherence of the expandable sealing material to the base support plate is a design concern.

To address various problems in the area of expandable gap filling products, such as those problems mentioned above and specifically experienced in the automotive and related industries, it would be desirable to provide an expandable gap filling product more efficiently manufactured for a wide variety of applications and more easily recycled or reclaimed.

SUMMARY OF THE INVENTION

The present invention therefore provides an expandable gap filling product for filling or blocking a defined space, such as a space within an automotive body structure. The expandable product of this invention generally includes a plastic support structure formed with at least one aperture. An expandable material is molded together with the plastic support structure such that a portion of the expandable material enters the aperture and cures to assist in holding at least a portion of the expandable material to the plastic support structure. The expandable material preferably expands into a closed cell foam product under heat to fill or block the defined space. The plastic support structure may be comprised of a nylon material while the expandable material may be a conventional expandable rubber based product which is expandable more than about 400%. Preferably, the plastic support structure is generally flat and includes first and second sides and a plurality of apertures formed between first and second sides. The expandable material is molded onto at least the first side of the support structure such that the expandable material enters the plurality of apertures in a flowable form and cures prior to expansion.

In accordance with one aspect of the invention, the plastic support structure may at least partially comprise a mesh structure. The expandable rubber material is preferably molded in a flowable state onto one side of the mesh structure such that the apertures in the mesh are filled with the rubber material. Optionally, the rubber material may be injected between two plastic support structures with apertures, such as those contained in a mesh pattern. The expandable product of this invention may further include an angled flange portion of expandable material, which also preferably includes a portion of the plastic support structure molded therein. This angled flange portion may serve as a support member for use in fastening the product to an automotive body structure. For this purpose, the angled flange portion may include at least one fastener for attaching the product to a structure, such as an automotive body structure. Fasteners may be integrally molded with the plastic support structure to optimize the various assembly or manufacturing processes. A portion of the expandable material may extend substantially outward from a periphery of the plastic support structure to provide for unique applications, such as those requiring expansion in an upward direction. Preferably, one or more of the apertures contained in the plastic support structure includes side walls that converge toward the side of the support structure that receives the expandable material. This further assists in retaining the expandable material to the support structure.

The present invention is also directed to methods of molding an expandable product, as described above. One method generally comprises the steps of molding a support structure from a plastic material, forming at least one aperture within the support structure, molding an expandable material to the support structure such that flowable expandable material enters the aperture, and curing the expandable material to adhere the expandable material to the support structure and within the aperture. In one preferred embodiment, the steps of molding the support structure and forming the aperture or apertures are performed during an injection molding process. In accordance with the invention, formation or molding of the plastic support structure may take place well prior to molding the expandable material. For example, plastic support structures may be formed and stored until subsequent use. The step of molding the expandable material to the support structure may involve an overmolding process or an injection molding process. In either case, the final molding process advantageously and preferably takes place in a mold having a shaped mold cavity identifiable with the desired shape of the final product. In the case of an injection molding process, the support structure may be injection molded in a first process step, and the step of molding the expandable material may be a second injection molding step performed after sufficient cooling of the support structure.

In accordance with the above methods, the support structure may be formed at least partially as a mesh material with a plurality of apertures, or may be formed as a plate with one or more apertures. Using conventional injection molding techniques, a plurality of apertures having the preferred, converging side wall construction also may be formed in the plastic support structure.

These and other objects and advantages of the invention will become more readily apparent to those of ordinary skill in the art upon review of the following detailed description of the preferred embodiments taken in conjunction with the drawings.

BRIEF DESCRIPTION OF THE DRAWINGS

FIG. 3 is a perspective view of a second embodiment of a gasket constructed in accordance with the invention having a continuous mesh support structure throughout and shown with the expandable material in an unexpanded state;

FIG. 3A is a perspective view of the gasket shown in FIG. 3, but showing the expandable material in an expanded state;

FIG. 4 is a perspective view of a third embodiment of a gasket constructed in accordance with the invention with the expandable material shown in an unexpanded state;

FIG. 4A is a perspective view of the gasket shown in FIG. 4, but showing the expandable material in an expanded state;

FIG. 5 is a perspective view of a baffle of this invention, having two plastic support structures sandwiching an expandable material therebetween;

FIG. 5A is a perspective view of the baffle shown in FIG. 5 but showing the expandable material in an expanded state;

DETAILED DESCRIPTION OF THE PREFERRED EMBODIMENTS

Figure 1:
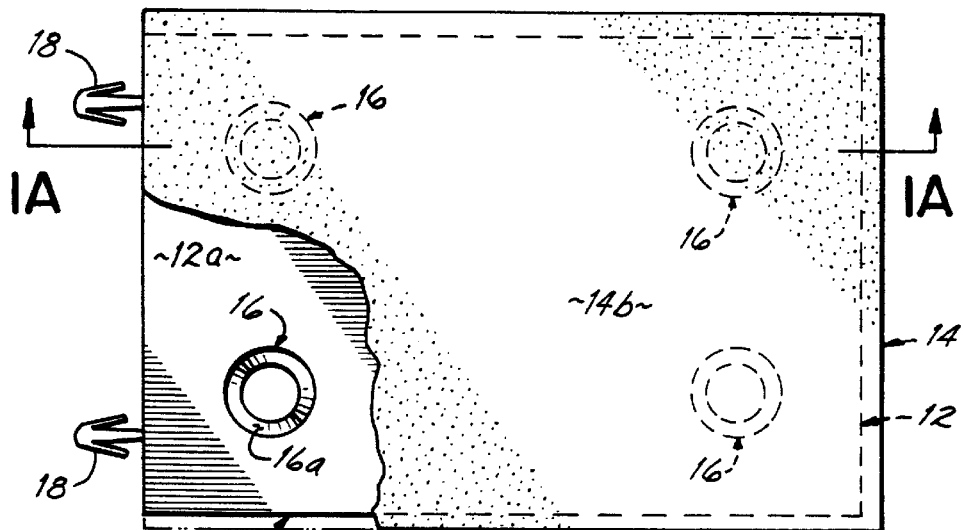
FIG. 1 is an elevational view of a first preferred expandable gap filling product formed as a gasket in accordance with the invention.
Figure 1A:
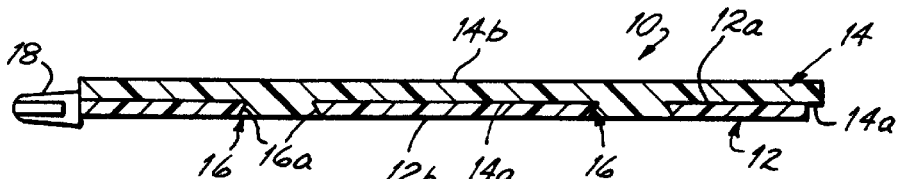
FIG. 1A is a cross sectional view taken along line 1A—1A of FIG. 1.

Referring first to FIGS. 1 and 1A, an expandable gap filling product is shown in the form of a gasket 10 constructed in accordance with a preferred embodiment of the invention. Gasket 10 specifically comprises a plastic support structure 12, which may be formed from a nylon material such as Nylon 66 which is 20% glass filled, and an expandable material 14 molded onto one side thereof. Expandable material 14 may be a conventional expandable material, such as one conforming to GM specification 9984188A-G. These materials may be used for the support structure and expandable material in each embodiment of this invention. In this embodiment, the support structure 12 more specifically comprises a plastic plate having respective first and second sides 12a, 12b. Expandable material 14 may be formed from a conventional expandable rubber or polymeric material capable of being injection molded, such as from conventionally sized 1/8"–3/16" pellets. Such materials may be expandable more than about 400%, such as in the range of about 400% to about 1500%. Expandable material 14 has respective first and second sides 14a, 14b. Plate 12 may be, for example, 2 mm thick and expandable material 14 may be 2–3 mm thick. Using injection molding or overmolding techniques, as will be discussed below, expandable material 14 is preferably molded onto plate support structure 12 in a flowable, heated state such that material 14c enters the plurality of apertures 16 in support structure 12. Preferably, material 14 is heated enough to create a doughy, extrudable consistency but not enough to activate the foaming or expansion process.

As further shown in FIGS. 1 and 1A, apertures 16 preferably have converging side walls 16a that assist in retaining material 14 on plate structure 12 after curing of material 14 takes place. Apertures 16 preferably converge toward first surface 12a of plate structure 12 or, in other words, toward the main body of expandable material 14. Support structure 12 further includes fasteners 18, which may be integrally molded with plate structure 12. Such fasteners may take many forms, such as separate fasteners, as will be discussed in further embodiments described below. Fasteners 18 are used to hold gasket 10 in place within a defined space, such as inside a hollow pillar structure of an automobile body (not shown).

Figure 2:
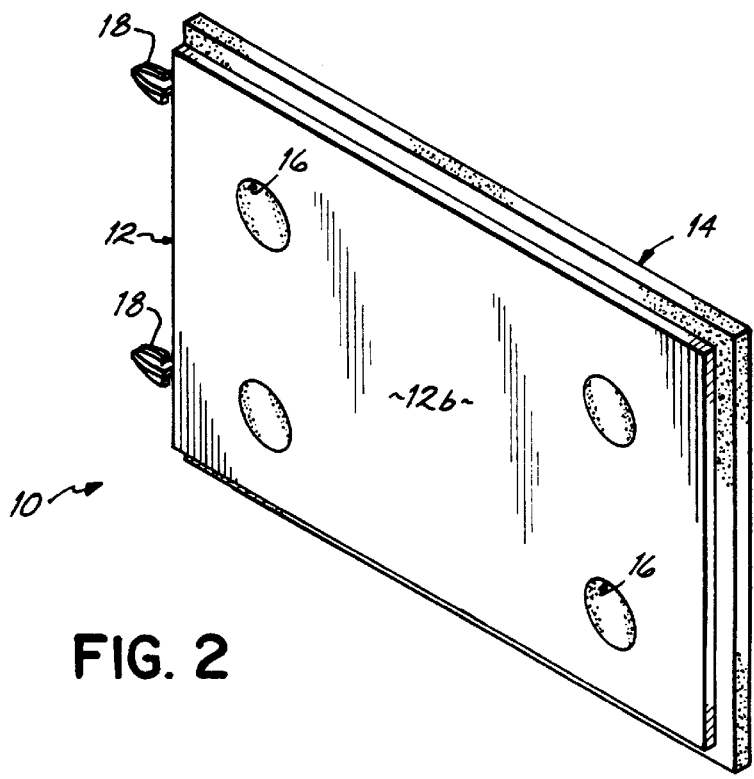
FIG. 2 is a perspective view of the embodiment of FIG. 1 with the invention with the expandable material shown in an unexpanded state.
Figure 2A:
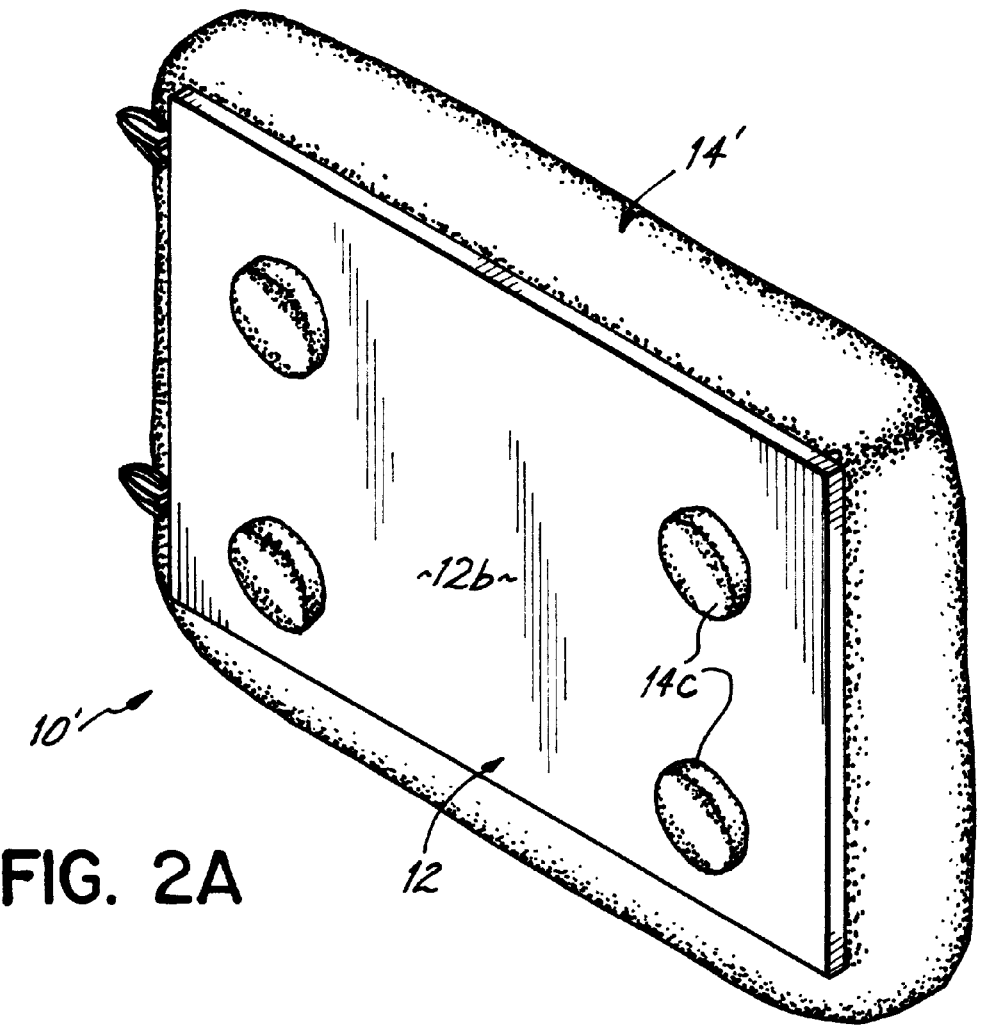
FIG. 2A is a perspective view of the gasket shown in FIG. 2, but showing the expandable material in an expanded state.

FIGS. 2 and 2A illustrate gasket 10 of FIGS. 1 and 1A respectively in an initial, unexpanded state and after a heating process has taken place to expand material 14 into its expanded form 14'. As shown in FIG. 2A, material 14' foams out of holes 16 during expansion. Material 14' also foams on the opposite side of plate 12 into a closed cell foam structure which may seal the defined space in which expanded gasket 10' is fastened.

FIGS. 3 and 3A illustrate a second embodiment of an expandable gasket 20 respectively in an unexpanded form 20 and an expanded form 20'. Specifically, gasket 20 comprises a main body portion 20a and a flange portion 20b which is angled with respect to the main body portion 20a. A support structure 22 comprising a nylon mesh extends continuously within both main body portion 20a and angled flange portion 20b. Portions of support structure 22 in main body 20a have not been shown in the drawing for simplicity. Expandable material 24 is molded to the mesh support structure 22 in both the main body portion 20a and angled flange portion 20b. In a manner similar to that discussed above with respect to apertures 16 of gasket 10, mesh support structure 22 includes apertures 26 within the mesh pattern of the support structure 22. These apertures receive flowable, heated expandable material 24 during a molding process used to form gasket 20. As is preferred with each disclosed embodiment of the invention, material 24 will expand into a closed cell foam as shown in the expanded form 24' in FIG. 3A. Thus, material 24 will expand through any aperture that it initially fills. As further shown in FIG. 3, separate fasteners 28 are inserted through holes (not shown) contained within angled flange portion 20b. These fasteners hold gasket 20 to an appropriate support element associated with a defined space to be filled or blocked, such as within a hollow automobile body structure (not shown).

FIGS. 4 and 4A respectively illustrate a third embodiment of an unexpanded gasket 30 and the expanded gasket 30' constructed in accordance with the invention. Gasket 30 comprises a support structure 32 formed as a mesh material. Like the previous embodiment, an expandable material 34 is molded to the mesh material 32 such that material 34 fills apertures 36 contained in the mesh material 32. After suitable heat is applied in a known manner, material 34 will expand into an expanded, closed cell foam 34' shown in FIG. 4A. Additionally, gasket 30 includes a portion 34a of expandable material 34 which extends outwardly from a periphery of support structure 32. This portion 34a may be utilized for unique sealing requirements, such as sealing in an upward direction within an automobile body frame structure. As an additional difference from previous embodiments, gasket 30 shows the use of integral flange portions 32a, 32b which are molded together with the meshed support structure 32, but which extend at an angle therefrom. Flange portions 32a, 32b may be used for fastening gasket 30 to an appropriate support element associated with the defined space to be filled, sealed or blocked. For this purpose, fastener clips 38 may be molded integrally with a flange portion 32a.

FIGS. 5 and 5A illustrate a baffle 40 constructed in accordance with the invention. FIG. 5 illustrates the unexpanded form 40 while FIG. 5A illustrates the expanded form 40' of the baffle. Baffle 40 is very similar to the previously described embodiments, with the main difference being that the expandable material 42 is sandwiched between two separate support structures 44, 46. As a further aspect of the invention, support structures 44, 46 each respectively include solid plate sections 44a, 46a and mesh sections 44b, 46b. Each support structure 44, 46 may be molded as a one piece plastic element having the desired solid and mesh sections. Respective apertures 47, 48 within each meshed portion 44b, 46b hold expandable material 42 which is molded therein and which subsequently cures into a solid, expandable material 42. During application of heat, material 42 expands into a closed cell foam 42' as shown in FIG. 5A. Fasteners 50 may be disposed on fastener tabs 52 extending from one support structure 44. Fastener tabs 52 may be mesh structures or may be solid plastic tabs as shown with integrally fasteners 50 or, optionally, separate fasteners held within holes (not shown).

Figure 6:
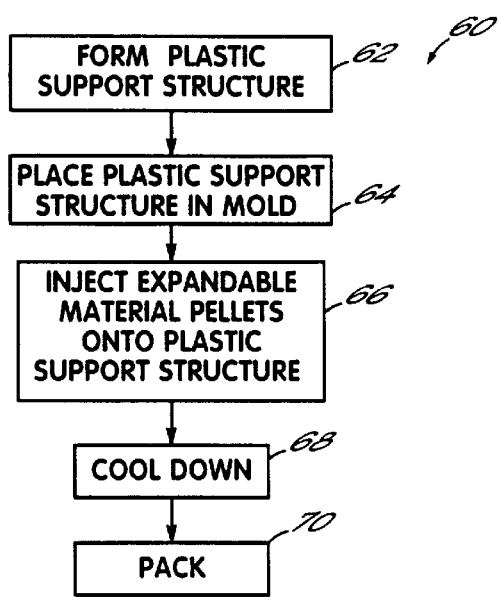
FIG. 6 is a process flow chart describing a first method for making the expandable gap filling product according to an insert molding process.

FIG. 6 illustrates a process flow chart 60 generally describing an insertion molding or overmolding process for forming a gasket in accordance with the invention. Although gasket 10 of the first embodiment will be referred to for clarity, it will be understood that this process may be easily adapted to form the other various embodiments of gaskets in accordance with this invention and in accordance with the description given below. In the preferred manner of carrying out this method, one mold is used to create a support structure 12 and another mold is used to overmold the expandable material 14 onto support structure 12. Support structure 12 may be injection molded in the first mold using conventional injection molding techniques to incorporate any desired shapes, bends and holes, such as apertures 16. Referring specifically to FIG. 6, in a first process step 62 a support structure is formed, for example, from Nylon 66 which is 20% glass filled. This material may be injection molded at a temperature of 450–500° F. After the support structure is formed and cooled below its deformation temperature, it may be placed in a mold during process step 64 to produce an expandable gasket 10. It will be appreciated that process steps 62 and 64 may be separated by significant amounts of time. For example, support structures 12 could be formed and stored in bulk prior to their use in process step 64. During process step 66, pellets of the expandable material 14, such as a conventional expandable rubber or polymer compounds are heated and injected or extruded into the final mold such that the material at least partially enters apertures 16 in support structure 12. Expandable material 14 is injected at a temperature below its foaming or expansion temperature and below the melting temperature of support structure 12. In a typical example, the foaming temperature of expandable material 14 may be about 300° F. Several conventional expandable materials, such as those compounded with suitable chemical blowing agents, curatives, fillers, additives, and one or more of a variety of rubber or thermoplastic polymers including butyl rubber, styrene butadiene rubber, ethylene propylene rubber, ethylene propylene diene rubber, nitrile rubber, polyurethane, ethylene-vinyl acetate polymers, polyolefins, ethylene-methyl acrylate polymers and ionomer resins, may be extrudable or injection moldable at temperatures below the foaming temperature, such as at a temperature of about 200° F. It has been found that expandable material 14 need only be heated to a doughy consistency to mold material 14 in accordance with the invention. During process step 68, gasket 10 is allowed to cool down and during process step 70 gasket 10 may be suitably packaged.

Figure 7:
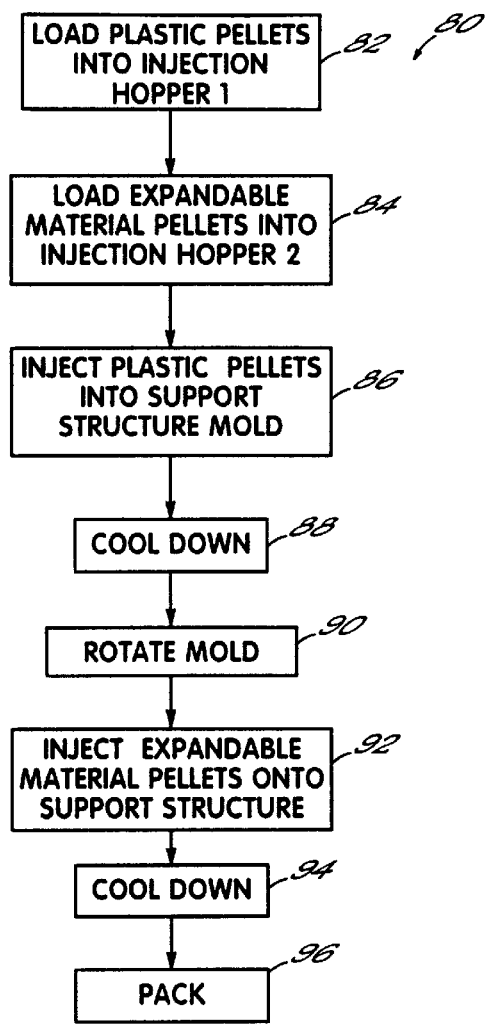
FIG. 7 is a process flow chart describing a second method for making the expandable gap filling product according to an injection molding process.

FIG. 7 illustrates one alternative method of forming a gasket, such as gasket 10 shown in FIGS. 1 and 2. This process is generally referred to as co-injection molding. In this process, two injection units with respective extrusion nozzles and one mold would be necessary with a conventional type of shuttle or rotary table used between the two molds. Specifically referring to FIG. 7, process 80 includes a first process step 82 in which plastic pellets, such as described with reference to FIG. 6, are loaded into a first injection unit hopper. In a second process step 84 pellets of expandable material, such as described with reference to FIG. 6, are loaded into a second injection unit hopper associated with the second mold. In process step 86, the plastic pellets are heated and injected into the first mold to create support structure 12. In process step 88, this initially formed support structure 12 is allowed to cool down. Then, in a process step 90 the table or shuttle is indexed to the second injection unit. In process step 92 the expandable material pellets are heated injected into the second mold now containing the support structure 12, such that flowable expandable material 14, at least having a doughy, viscous consistency fills apertures 16 in the support structure 12. In process step 94, the final product 10 is allowed to cool and in process step 96 gasket 10 is suitably packaged. The general temperature relationships of the plastic and expandable materials described in reference to FIG. 6 apply to co-injection method 80 as well. With respect to both methods, it is contemplated that both the plastic material and expandable material could be injection molded in relatively low viscosity liquid form, depending on the chosen materials.

This has been a description of the present invention, along with the preferred methods of practicing the present invention as currently known. While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. For example, gaskets, seals, baffles or other gap filling products of many different two or three dimensional shapes may be produced in accordance with the invention and various types or numbers of support structures and expandable material sections may be used to produce such expandable products in accordance with the scope of this invention. The invention in its broader aspects is therefore not limited to the specific details, representative apparatus and methods as shown and described but is defined by the appended claims.

We claim:

1. A method of molding an expandable gap filling product useful for filling or blocking a defined space, the method comprising the steps of:

molding a support structure from a plastic material;

forming at least one aperture within the support structure;

molding an expandable gap filling material to the support structure such that gap filling material flows into the aperture; and curing the expandable gap filling material to adhere the gap filling material to the support structure and within the aperture, wherein the gap filling material is then expandable into a foam product under heat to fill or block the defined space.

2. The method of claim 1, wherein the steps of molding the support structure and forming at least one aperture are performed during an injection molding process.

3. The method of claim 1 wherein the step of molding the expandable gap filling material to the support structure is performed by an overmolding process.

4. The method of claim 1 wherein the steps of molding the support structure, forming at least one aperture and molding the expandable gap filling material are each performed during an injection molding process.

5. The method of claim 1 wherein the support structure at least partially includes a mesh material formed with a plurality of said apertures.

6. The method of claim 1 wherein the support structure includes a plate formed with a plurality of said apertures.

7. The method of claim 6 wherein the plurality of apertures are formed with converging side walls to assist in retaining the gap filling material therein.

8. The method of claim 1 wherein the aperture is formed with converging side walls to assist in retaining the gap filling material therein.

9. A method of molding an expandable gap filling product useful for filling or blocking a defined space, the method comprising the steps of:

introducing a flowable plastic material into a first mold to form a meshed support structure;

at least partially curing the meshed support structure;

placing the meshed support structure in a second mold having a predetermined shape identifiable with the gap filling product; and introducing a flowable, expandable material into the second mold so that the expandable material flows into apertures contained in the meshed support structure, wherein the expandable material is then expandable into a foam upon application of heat to fill or block the defined space.

10. A method of molding an expandable gap filling product useful for filling or blocking a defined space, the method comprising the steps of:

providing a plastic support structure having at least one aperture;

placing the plastic support structure in a mold having a predetermined shape identifiable with the gap filling product; and introducing a flowable, expandable material into the second mold so that the expandable material flows into the aperture contained in the plastic support structure, wherein the expandable material is then expandable into a foam upon application of heat to fill or block the defined space.

* * * * *